United States Patent [19]

Shih

[11] Patent Number: 5,130,376
[45] Date of Patent: Jul. 14, 1992

[54] UHMWPE/STYRENIC MOLDING COMPOSITIONS WITH IMPROVED FLOW PROPERTIES AND IMPACT STRENGTH

[75] Inventor: Keith S. Shih, Wilmington, Del.

[73] Assignee: Hercules Incorporated, Wilmington, Del.

[21] Appl. No.: 512,720

[22] Filed: Apr. 23, 1990

[51] Int. Cl.⁵ .................... C08F 255/02; C08L 23/06; C08L 23/26
[52] U.S. Cl. .................... 525/309; 525/289; 525/305; 525/324; 525/240; 525/264; 525/316
[58] Field of Search ................. 525/324, 309

[56] References Cited

U.S. PATENT DOCUMENTS

| | | | |
|---|---|---|---|
| 3,274,328 | 9/1966 | Davis | 525/240 |
| 3,911,051 | 10/1975 | Schouten et al. | |
| 4,927,871 | 5/1990 | Ohori et al. | |
| 4,952,625 | 8/1990 | Shiohara et al. | |

FOREIGN PATENT DOCUMENTS 192109 8/1986 European Pat. Off. .

OTHER PUBLICATIONS

Chemical Wk-A Better Styrene Goes Commercial-Feb. 17, 1982-pp. 42-46.

Primary Examiner—Carman J. Seccuro
Attorney, Agent, or Firm—William S. Alexander; Mark Goldberg

[57] ABSTRACT

Compositions comprised of ultra-high molecular weight polyethylene slurried in a styrene monomer containing a styrene crosslinker and a free radical catalyst are disclosed. These slurries are subjected to heating in a mold whereby the polyethylene phase is dissolved in the styrene monomer and the styrene monomer is polymerized to form a shaped article. The polystyrene/polyethylene product has unique properties.

12 Claims, No Drawings

UHMWPE/STYRENIC MOLDING COMPOSITIONS WITH IMPROVED FLOW PROPERTIES AND IMPACT STRENGTH

This invention relates to a novel method of preparing tough, abrasion resistant materials containing ultra high molecular weight polyethylene and to tough, abrasion resistant materials thus prepared. In a specific embodiment, it relates to the formation of shaped articles of such materials by reaction molding techniques at relatively low temperatures and pressures.

Ultra high molecular weight polyethylene (UHMWPE), a high density polyethylene having a molecular weight ranging from about 1.5 million to about 6 million as measured by viscosimetric methods, is a commercially available material having some very attractive properties. In particular, this polymer has very high impact strength, high abrasion resistance, a low coefficient of friction and chemical inertness. Commercial exploitation of these properties has, however, been hampered by the fact that UHMWPE is extremely difficult to form by conventional molding methods.

Most shaped UHMWPE articles are currently made by machining the shape from molded bars or billets, similarly to metal fabrication. The bars and billets are usually made by sintering of particulate polymer at very high temperatures and pressures, on the order of about 1200 to 1500 psi and 160 to 200° C. The sintering technique is also used to form finished shaped articles, but it is also unsatisfactory because the time and energy required to prepare a molded object are impractically great. Also, objects produced by the sintering process must be cooled slowly in the mold after processing to avoid cracking and deformation associated with rapid cooling. Such time considerations make thus-prepared objects too expensive for most applications and, moreover, complex shapes are virtually impossible to make.

A technique to enable less troublesome formation of shaped articles of UHMWPE and thus take advantage of its highly desirable properties has been the subject of much research effort in recent years.

U.S. Pat. No. 3,911,051 to Schouten et al teaches a UHMWPE composition suitable for molding which comprises a blend of UHMWPE and a highly unsaturated, crosslinkable hydrocarbon rubber binder along with a crosslinker to crosslink the binder phase. The product appears to be a dispersion of particulate UHMWPE in a rubber matrix.

European Patent Application 277,750 teaches processing of UHMWPE by dispersing it in an intimate mixture with a "flowability improver", preferably an aliphatic hydrocarbon having a melting point 20° to 70° C. below that of UHMWPE. The mixture is melt extruded at a temperature above the melting point of UHMWPE following which the flowability improver is removed.

More recently, in U.S. patent application Ser. No. 512,721 filed on even date herewith by Daniel W. Klosiewicz, and commonly assigned with this application, there are described blends of ultra high molecular weight polyethylene (UHMWPE) and polystyrene which exhibit most of the desirable properties of UHMWPE. These compositions are prepared by dissolving or dispersing the UHMWPE in a styrene monomer and polymerizing the styrene monomer in a suitable mold or other forming device. This invention is intended as an improvement on Klosiewicz which allows the Klosiewicz method to be carried out with lower levels of UHMWPE.

BRIEF DESCRIPTION OF THE INVENTION

According to this invention, there is provided a novel composition of UHMWPE comprising an intimate mixture of UHMWPE and a styrene polymer which exhibits most of the desirable properties of UHMWPE, but which is readily formed by thermal techniques at relatively low temperatures and pressures. More specifically, the novel composition of this invention is an intimate blend of about 35 to 60% UHMWPE by weight and 40 to 65% of a crosslinked styrene polymer by weight. In an alternative embodiment, a portion of the styrene phase can be replaced by a second vinyl monomer.

The invention also contemplates a technique for manufacturing a shaped article of the novel UHMWPE composition which comprises charging to a mold a dispersion of particulate UHMWPE in a styrene monomer containing a crosslinking agent and a free radical polymerization catalyst and heating the mold to a temperature between about 130 and 170° C. to effect polymerization of the styrene monomer.

DETAILED DESCRIPTION OF THE INVENTION

In accordance with this invention, polymer blends are provided comprising about 35 to 60% by weight of UHMWPE and 65 to 40% by weight of a styrene monomer phase. The advantages of the invention are particularly achieved at concentrations between about 35 to 55% by weight of UHMWPE and 65 to 45% by weight of the styrene monomer phase. The styrene monomer phase can also include up to about 10% based on the weight of the total styrene monomer phase of at least one other free radical vinyl polymerizable monomer.

The polymer blends according to this invention exhibit improved impact strength, compared with similar blends wherein no crosslinker is employed, but without a decrease in stiffness. Other properties such as tensile strength and yield strength are also improved.

UHMWPE usable in this invention is a nominally thermoplastic polymer of ethylene having a molecular weight of about 1.5 to 6 million, as measured by viscosimetric methods. (Hereinafter, references to "polyethylene" are intended to refer to UHMWPE.) The melting point is about 140° C., but due to its ultra high molecular weight, it exhibits melt properties more closely resembling those of a crosslinked material than a thermoplastic. Thus, at the melting point, particles can be deformed, but the polymer does not flow freely in the sense generally associated with thermoplastics. For this reason, it is extremely difficult to thermoform these materials via, e.g., injection or compression molding.

To charge the UHMWPE to a mold for forming, in accordance with this invention, the particulate polymer is suspended in a styrene monomer containing a crosslinking agent and a heat activated free-radical catalyst to make a flowable slurry in which the void space between the polymer particles is occupied by the liquid monomer and the cross-linking agent. The thin layer of liquid between the particles provides sufficient lubricity that solid particles can flow for charging to a mold. The term "flowable" is not meant to be limited to "pumpable". A slurry can be regarded as flowable even though its viscosity is such that it cannot readily be pumped, if, upon being poured into a mold, it will assume, or can be made to assume, the shape of the mold as, e.g., by applying compressive pressure. As would be expected, the slurry viscosity increases with UHMWPE content. Generally speaking, the slurries employed in this invention which have a solids (polyethylene) content of less than 55% have flow properties such that they can be referred to as pumpable. Solids contents as high as 75% can be employed. At such levels, the slurries cannot be referred to as pumpable, but they can still be made to assume the shape of a mold. Thus, pumpability, while highly desirable in that it facilitates charging the composition into molds by conventional injection techniques, is not an absolute requirement.

At all concentration levels flow properties are better with large particle polyethylene as larger particle polyethylene has less open pores or cavities to absorb the liquid monomer. Commercially, UHMWPE is available in a variety of particle sizes, ranging from material that is 85% less than 75 $\mu$m to material of 94 to 98% greater than 180 $\mu$m. In addition to the effect of particle size, polydispersity affects the flowability of the slurries. The effect of polydispersity does not become critical until the solid constant reaches the critical volume faction of the mixture (0.65 to 0.75).

The styrene monomer which can be employed in the process and compositions of this invention is styrene or a ring-substituted alkyl styrene wherein the alkyl substituent has 1 to about 4 carbons. It is preferred to use the alkyl styrenes due to their having higher boiling points than unsubstituted styrene. Any of the ring-substituted, 1 to 4 carbon alkyl styrenes can be used. Typical alkyl styrenes which can be employed are o-methyl styrene, p-methyl styrene, o-ethyl styrene, p-butyl styrene, p-isobutyl styrene, m-methyl styrene and m-ethyl styrene. The p-methyl styrene isomer is preferred among the alkyl styrenes.

The styrene can be partially replaced by another monomer polymerizable by the free radical, vinyl polymerization catalyst if desired. Any such monomer having a boiling point greater than about 130° C. can be used such as, e.g., acrylic acid, butyl acrylate, butyl methacrylate, phenyl acrylate and phenyl methacrylate. When present, the optional vinyl polymerizable monomer can replace up to about 10% by weight of the styrene monomer.

Crosslinking agents which can be used in the compositions of this invention are materials containing more than one point of free radical polymerizable vinyl unsaturation in a molecule. Such materials include, e.g., divinyl benzene, diisopropenyl benzene, diallyl benzene, diallyl phthalate, vinyl norbornene, trimethylolpropane trimethacrylate, tetraethyleneglycol dimethacrylate, and vinyl acrylate. If the crosslinker is intended to effect crosslinking only, an effective amount is about 0.1 to 8%, preferably about 0.1 to 4%. However, it is found that by adding the crosslinker in amounts greater than crosslinking amounts such that it becomes, in effect, a comonomer, the cure time of the compositions can be significantly reduced. In this case, amounts of crosslinker up to about 50% are used. The preferred crosslinker is divinyl benzene due to its structural similarity to styrene.

The slurry composition will also contain a catalytic amount of a free radical, vinyl polymerization catalyst. Any of the known heat-activated free radical catalysts can be used provided that the activation does not take place below about 130° C.. Preferred such catalysts are organic peroxides such as, e.g., t-butyl cumyl peroxide, dicumyl peroxide, t-butyl perbenzoate or dibutyl peroxide. It is also possible to use a mixture of a high temperature and a low temperature decomposing peroxide. The amount of catalyst required is a catalytic amount, e.g., about 0.2 to 1% by weight, based on the weight of styrene monomer (or mixed monomers) in the system. Lower or greater amounts can be used, but lower amounts result in longer cure time, while greater amounts offer no advantage.

When the UHMWPE/styrene monomer slurry is charged to a mold and heat is applied, the UHMWPE dissolves in the styrene monomer at a temperature of about 120° to 125° C., forming a gel. This dissolution is apparent on a DSC scan curve as an endotherm indication between 120° and 125° C.. Dissolution takes place prior to occurrence of any significant amount of polymerization. When the temperature is increased to about 155° to 165° C., polymerization of the styrene monomer and crosslinking are initiated, leading to formation of an interpenetrating network of UHMWPE and crosslinked styrene polymer.

Reaction time, or cure time, for the polymerization and crosslinking is affected by the amount of catalyst employed. With a catalyst concentration of about 0.5 to 4%, based on the weight of UHMWPE plus styrene monomer, cure time is fast enough within the 155° to 165° C. temperature range for practical use of the process to prepare shaped articles for high performance specialty polymer applications. Polymerization and crosslinking are usually completed in about 2 to 15 minutes. Increasing or decreasing the catalyst concentration will change the cure time accordingly. A typical cure time for a slurry containing 1% of a peroxide catalyst, based on the weight of the monomers, is about 350 seconds.

Increasing catalyst level also leads to a lessening of the residual volatiles, i.e., residual styrene monomer, in the molded product. This is a desirable characteristic in a liquid molding or reaction molding operation as contemplated for economic reasons and also for aesthetic reasons due to the unpleasant odor generally associated with styrene monomers. An increase in catalyst concentration from 0.25 to 0.5% can decrease the residual monomer concentration by as much as 50% or more.

As pointed out hereinabove, the cure time can also be reduced by increasing the amount of crosslinker. At 50% by weight crosslinker concentration, the cure time can be reduced to as little as sixty seconds.

Since the polymerization of the styrene monomer takes place at about 160° C. and higher, and the boiling point of styrene monomer and the methyl styrenes is about 140° to 150° C., a problem sometimes encountered is that significant amounts of monomer can be volatilized off when the UHMWPE/styrene/crosslinker slurry is shaped in a hot mold. When the mold is closed and the styrene monomer is heated, expansion occurs and portions of the volatilized monomer can be squeezed out of the mold. To alleviate this problem, a small amount of a compatible styrene-soluble elastomer, such as, e.g., styrene-butadiene rubber (SBR), ethylene-propylenediene rubber or natural rubber can be added. When a more polar vinyl-polymerizable monomer, such as an acrylate, is included in the monomer mix, more polar elastomers such as styrene-acrylonitrile can be used. The elastomer tends to maintain the slurry viscosity at a higher level as it is heated, making it more difficult for the monomer to volatilize. Also, when leakage does occur, the leaking monomer evaporates and leaves behind a layer of the elastomer which seals the mold against further leakage. Amounts of elastomer up to about 10% by weight, preferably about 2 to 10% based on the weight of the UHMWPE plus styrene monomer, can be used. The presence of the elastomer also contributes to the impact strength of the blends after molding and curing. This effect is particularly noticeable at lower levels of UHMWPE loading.

Gel swell values of the polymerization product demonstrate that it is, in fact, an interpenetrating, crosslinked polymer network. Other physical properties of the polymer blends vary over the specified concentration ranges. At about a 50/50 concentration of UHMWPE to polystyrene, the properties, i.e., stiffness and impact strength, resemble the properties of a tough polystyrene. The data set forth hereinafter show a trend wherein tensile strength and yield strength decrease as the polystyrene content increases while modulus (stiffness) increases with increasing polystyrene content.

The alloys of this invention also have a good degree of abrasion resistance. Although this characteristic of the alloys is not as good as that of UHMWPE itself, it is substantially better than that of many other polymers which are employed in the applications for which these alloys are intended.

Abrasion Index is determined by rotating a rectangular plaque of the alloy in a 50/50 sand/water slurry at 1750 RPM for fifteen hours. Ratings are expressed as a percentage of the volume lost by the test disc compared to that lost by a disc of carbon steel of the same size. Carbon steel is assigned the rating of 100.

The alloys of this invention exhibit Abrasion Index values well below that of carbon steel, i.e., between about 35 and 70. Abrasion Index of neat UHMWPE is 10.

EXAMPLES 1 TO 10

A series of reaction mixtures comprised of 4-methyl styrene containing 10 wt. % SBR and UHMWPE in various ratios were prepared. Each contained about 1.0 wt. %, based on the styrene content, of t-butyl cumyl peroxide as a vinyl polymerization catalyst. For each ratio of 4-methyl styrene to UHMWE, one mix included about 2 wt. % (based on weight of 4-methyl styrene) of divinyl benzene (DVB) and the control mix did not.

When the mixture was thoroughly mixed, the resulting slurry was poured into a 5×5×¼ inch plaque mold at room temperature. The filled mold was transferred to a press heated to a temperature between about 150° and 170° C. and subjected to about 300 to 500 psi pressure. The filled mold is held under these conditions for about 10 to 15 minutes until cured by polymerization and crosslinking of the 4-methyl styrene phase.

Table 1 sets forth the Impact Strength and Abrasion Index of the samples prepared for Examples 1 to 10.

TABLE 1

| Example No. | UHMWPE Content | Impact Strength*** ft lb/inch | Abrasion Index |
|---|---|---|---|
| Control 1 | 60 wt. % | 15.7 HiFax 1900* | 44 |
| Ex. 1 | 60 wt. % | 18.1 HiFax 1900 | 43 |
| Control 2 | 53 wt. % | 7.0 HiFax 1900 | |
| Ex. 2 | 53 wt. % | 17.1 HiFax 1900 | |
| Ex. 3 | 50 wt. % | 28.3 HiFax 1900 | 71 |

TABLE 1-continued

| Example No. | UHMWPE Content | Impact Strength*** ft lb/inch | Abrasion Index |
|---|---|---|---|
| Control 4 | 45 wt. % | 2.6 HiFax 1900 | 73 |
| Ex. 4 | 45 wt. % | 15.2 HiFax 1900 | 78 |
| Control 5 | 40 wt. % | 0.9 HiFax 1900 | 113 |
| Ex. 5 | 40 wt. % | 9.5 HiFax 1900 | 119 |
| Control 6 | 60 wt. % | 19.2 GUR 403F** | 45 |
| Ex. 6 | 60 wt. % | 19.0 GUR 403F | 39 |
| Control 7 | 53 wt. % | 19.2 GUR 403F | 74 |
| Ex. 7 | 53 wt. % | 17.6 GUR 403F | 60 |
| Control 8 | 50 wt. % | 15.9 GUR 403F | 69 |
| Ex. 8 | 50 wt. % | 17.0 GUR 403F | 74 |
| Control 9 | 45 wt. % | 4.5 GUR 403F | 109 |
| Ex. 9 | 45 wt. % | 15.7 GUR 403F | 115 |
| Control 10 | 40 wt. % | 3.1 GUR 403F | 122 |
| Ex. 10 | 40 wt. % | 13.4 GUR 403F | 117 |

*HiFax 1900 from HIMONT Inc., Wilmington, Delaware (75-200 μm particle size).
**GUR 403F from Hoechst Celanese Corp. (25-75 particle size).
***Notched Izod Impact Strength; samples did not break completely.

From the data of Examples 1 through 10, it can be seen that crosslinking of the styrene phase has a definite beneficial effect on the impact strength of the compositions.

The data show that the degree of improvement of impact strength is greater at lower levels of polystyrene content. Referring to Example 5, it can be seen that crosslinking the polystyrene phase increases the impact strength from 0.9 ft. lb./inch to 9.5 ft. lbs./inch, i.e., an increase of greater than 900%. Referring to Example 1, the increase is only 15%. These data demonstrate that the upper limit of impact improvement occurs at about 55% crosslinked polystyrene.

EXAMPLES 11 AND 12

Test plaques were prepared in similar fashion to Example 1 to 10 for tensile testing. Results are recorded in Table 2.

TABLE 2

| Example No. | Composition | Tensile Strength | Tensile Modulus | Elongation at Break |
|---|---|---|---|---|
| Control 11 | 40 wt. % GUR 403F | 4100 | 160,000 | 310% |
| Ex. 11 | 40 wt. % GUR 403F | 4400 | 165,000 | 190% |
| Control 12 | 30 wt. % GUR 403F | 3900 | 176,000 | 20% |
| Ex. 12 | 30 wt. % GUR 403F (2% DVB) | 4300 | 179,000 | 80% |

EXAMPLE 13

In this example 40% by weight GUR 403F UHMWPE was employed and 8% by weight of the 4-methyl styrene phase was replaced by phenyl acrylate and 2% trimethylolpropane trimethacrylate (TMPTMA) based on 4-methyl styrene was employed as the crosslinker. The Notched Izod Impact Strength was 14.3 ft. lbs./in. when the TMPTMA was used and 5.9 ft. lbs./inch when the TMPTMA was absent.

It will be noted that the impact strength of these materials is better than the corresponding material shown in Example 10.

EXAMPLE 14

A series of polymerizations were carried out wherein the concentration of crosslinker (DVB in this case) was varied. In these experiments, the UHMWPE content was 40% GUR 403F and rubber was Stereon 730A, a SBR rubber, which is not as readily miscible witn styrene as was the SBR employed in previous examples. Properties of these materials are recorded in Table 3.

TABLE 3

| DVB Concentration | Impact Strength | % Swell |
|---|---|---|
| 1% | 5 | 287 |
| 2% | 6.5 | 238 |
| 4% | 9.3 | 214 |
| 8% | 6.7 | 167 |

From the above, it will be noted that impact strength appears to peak at about 4% crosslinker. This is consistent with other known crosslinked systems where impact strength decreases at higher levels of crosslinking. The overall level of impact strength is lower for tnese examples than in, e.g., Example 10, due to the reduced miscibility of the rubber employed in tnese runs.

EXAMPLES 15 TO 18

Using the procedures substantially as described for Examples 1 through 10, a series of polymerizations were carried out using 4-methyl styrene and crosslinkers other than DVB. Here again significant improvements in impact strength were observed compared to the controls reported in Table 1 above. Impact strengths of these polymers are reported in Table 4.

TABLE 4

| Example No. | Composition | Crosslinker | Wt. % Crosslinker | Impact Strength ft-lb/in. |
|---|---|---|---|---|
| 15 | 40 wt. % UHMWPE | TEGDM* | 2 | 9.2 |
| 16 | 40 wt. % UHMWPE | TEGDM | 4 | 12.0 |
| 17 | 40 wt. % UHMWPE | TMPTMA** | 2 | 5.9 |
| 18 | 40 wt. % UHMWPE | di-isopropenyl benzene | 2 | 10.7 |

*triethyleneglycol dimethacrylate
**trimethylolpropane trimethacrylate

The fluid mixtures of UHMWPE and styrene monomer can be processed by various liquid molding techniques such as reaction injection molding (RIM), resin transfer molding (RTM), and pultrusion. The curing time can be adjusted to suit the particle processing technique by appropriate selection of the molding temperature. In addition, the products can be used as matrix resins for various types of composites using glass or other fibrous reinforcements.

EXAMPLES 19 TO 22

To show the effect of the elastomer on impact strength, examples were run with and without rubber following the procedures of Example 1 to 10. Results are recorded in Table 5. The elastomer employed was SBR.

TABLE 5

| Example No. | UHMWPE Conc. | Rubber Conc. | Impact Strength ft-lb/in. | Abrasion Index |
|---|---|---|---|---|
| 19 | 40% | 0 | 1.1 | 173 |
| 20 | 40% | 10 | 13.4 | 117 |
| 21 | 60% | 0 | 19.2 | 32 |
| 22 | 60% | 10 | 19.0 | 39 |

EXAMPLES 23 TO 27

To demonstrate the effect of increasing crosslinker concentration on the curing rate of the styrene-/UHMWPE systems, a series of runs were carried out at varying crosslinker concentration. Polymerizations were carried out as in Examples 1 to 10. All formulations contain 10% SBR rubber and divinyl benzene as crosslinker. Results are recorded in Table 6.

TABLE 6

| Example No. | Cat. Con. | DVB | Cure Time (sec.) |
|---|---|---|---|
| 23 | 1.5%* | 2% | 200 |
| 24 | 1.6%* | 12% | 150 |
| 25 | 1.6%** | 24% | 80 |
| 26 | 1.6%** | 36% | 70 |
| 27 | 1.5%* | 50% | 60 |

*Catalyst is mixture of equal parts benzoylperoxide, 1,1-di-t-butyl peroxy-3,5,5-trimethyl cyclohexane and t-butyl-perbenzoate.
**Catalyst is 50/50 mixture of 1,1-di-t-butyl peroxy-3,5,5-trimethyl cyclohexane and t-butyl perbenzoate.

What I claim and desire to protect by Letters Patent is:

1. A method of forming shaped articles comprising ultra high molecular weight polyethylene (UHMWPE), having a molecular weight of between about 1,500,000 and 6,000,000 as measured by viscosimetric methods, and a styrene polymer, wherein said styrene polymer is polystyrene or a polymer of a ring substituted, 1–4 carbon alkyl styrene, wherein said method comprises slurrying particulate UHMWPE in a mixture of monomeis consisting of swtyrene or ring substituted, 1–4 carbon alkyl styrene, up to 10% by weight of the styrene or substituted styrene monomer of another vinyl polymerizable monomer containing a free radical catalyst, wherein said crosslinking monomer comprises more than one vinyl group, charging the resultant slurry to a heated mold and heating said mold to a temperature sufficient to cause the UHMWPE to dissolve in said monomer charge and to cause the styrene monomer to polymerize and crosslink to a solid polymer, wherein said temperature sufficient to cause UHMPWE to dissolve is in the range of about 120° to 125° C. and wherein said temperature sufficient to cause the monomer to polymerize is in the range of about 155° to 165° C.

2. The method of claim 1 wherien the styrene monomer phase contains up to about 10% by weight of an elastomer dissolved or dispersed therein.

3. The method of claim 2 wherein the crosslinker is present in an amount of about 0.1 to 50% by weight based on the weight of the styrene monomer.

4. A blend of ultra high molecular weight polyethylene having a molecular weight of between about 1,500,000 and 6,000,000 as measured by viscosimetric methods and a styrene polymer, wherein said blend contains about 35 to 60% by weight of UHMWPE and wherein said blend is formed by first mixing said ultra high molecular weight polyethylene and a mixture of monomers consisting of styrene monomer or ring substituted, 1–4 carbon alkyl styrene monomer, up to about 10% by weight of the styrene or substituted styrene monomer of another vinyl polymerizable monomer and a cross-linking monomer wherein said styrene polymer is a crosslinked polymer of styrene or a polymer of a ring substituted, 1–4 carbon alkyl styrene, and wherein said crosslinked polymer has been crosslinked by addition of the crosslinking monomer to said mixture, wherein said crosslinking monomer comprises more than one vinyl group, and then polymerizing said styrene monomer at a temperature in the range of from about 155° to 165° C.

5. The blend of claim 4 which contains about 0.1 to 50% by weight of the crosslinker based on the weight of styrene polymer.

6. The blend of claim 5 wherein the crosslinker content is about 0.1 to 8%.

7. The blend of claim 4 containing up to about 10% of an elastomer, based on the weight of the crosslinked styrene polymer.

8. The blend of claim 4 wherein the styrene polymer is poly(4-methyl styrene) crosslinked via divinyl benzene.

9. The blend of claim 4 wherein the other vinyl monomer is selected from the class consisting of phenyl acrylate, phenyl methacrylate, butyl acrylate and butyl methacrylate.

10. The blend of claim 6 wherein the concentration of UHMWPE is about 35 to 55%.

11. The blend of claim 10 wherein the crosslinked styrene is poly(4-methyl styrene) crosslinked via divinyl benzene.

12. The blend of claim 11 wherein the concentration of UHMWPE is about 35 to 55%.

* * * * *